US009238187B2

(12) United States Patent
Kawaguchi

(10) Patent No.: US 9,238,187 B2
(45) Date of Patent: Jan. 19, 2016

(54) FILTER DEVICE

(75) Inventor: Shoh Kawaguchi, Hilliard, OH (US)

(73) Assignee: Nifco Inc., Yokohama-shi, Kanagawa (JP)

( * ) Notice: Subject to any disclaimer, the term of this patent is extended or adjusted under 35 U.S.C. 154(b) by 455 days.

(21) Appl. No.: 13/642,339

(22) PCT Filed: Nov. 4, 2010

(86) PCT No.: PCT/JP2010/069629
§ 371 (c)(1),
(2), (4) Date: Jan. 7, 2013

(87) PCT Pub. No.: WO2011/132341
PCT Pub. Date: Oct. 27, 2011

(65) Prior Publication Data
US 2013/0206679 A1 Aug. 15, 2013

(30) Foreign Application Priority Data

Apr. 22, 2010 (JP) ................. 2010-098720

(51) Int. Cl.
B01D 29/11 (2006.01)
B01D 29/15 (2006.01)
B01D 35/02 (2006.01)
F28F 19/01 (2006.01)

(52) U.S. Cl.
CPC .............. B01D 29/11 (2013.01); B01D 29/15 (2013.01); B01D 35/02 (2013.01); F28F 19/01 (2013.01); B01D 2201/02 (2013.01); B01D 2201/295 (2013.01); B01D 2201/34 (2013.01)

(58) Field of Classification Search
None
See application file for complete search history.

(56) References Cited

U.S. PATENT DOCUMENTS

| 4,149,974 | A | | 4/1979 | Bolton et al. | |
|---|---|---|---|---|---|
| 4,468,217 | A | * | 8/1984 | Kuzmick et al. | 604/48 |
| 5,252,204 | A | * | 10/1993 | Chiodo | 210/232 |
| 5,393,425 | A | * | 2/1995 | Cobb, Jr. | 210/461 |
| 6,177,010 | B1 | | 1/2001 | Schamel et al. | |
| 6,231,762 | B1 | * | 5/2001 | Marshall, III | 210/234 |
| 6,849,179 | B1 | * | 2/2005 | Taylor et al. | 210/223 |

FOREIGN PATENT DOCUMENTS

| JP | 1973-1066 U | 1/1973 |
|---|---|---|
| JP | 48-9751 Y1 | 3/1973 |
| JP | 56-39925 A | 9/1981 |

(Continued)

OTHER PUBLICATIONS

PCT, "International Search Report for PCT/JP2010/069629" Dec. 14, 2010.

Primary Examiner — Benjamin Kurtz
(74) Attorney, Agent, or Firm — Manabu Kanesaka

(57) ABSTRACT

A filter device includes a main body portion having a cylinder shape, and the main body portion is inserted along a center axis of the pipe. One end portion of the main body portion structuring a filter device is blocked. At least one portion of a flange portion is provided between both end portions of the cylinder, and the flange portion divides a space inside the pipe in a liquid-tight state by elastically deforming and by being attached firmly to an inner surface of the pipe. A first passing portion of the liquid is provided in a cylinder side portion between the one end portion of the cylinder and the flange portion, and a second passing portion of the liquid is provided on a side close to the other end portion of the cylinder than the flange portion.

2 Claims, 5 Drawing Sheets

(56) References Cited

FOREIGN PATENT DOCUMENTS

| JP | 58-6217 A | 1/1983 |
| JP | 1988-1611 U | 1/1988 |
| JP | S63-049539 U | 4/1988 |
| JP | 07-075706 A | 3/1995 |
| JP | 2000-185207 A | 7/2000 |
| JP | 2000-342913 A | 12/2000 |

* cited by examiner

FILTER DEVICE

FIELD OF TECHNOLOGY

The present invention relates to an improvement of a filter device inserted into a pipe which becomes a flow channel of a liquid, and filtering the liquid flowing inside the pipe.

BACKGROUND ART

There is a filter 100 in which a pipe P, which becomes the flow channel for cooling water of a radiator, is provided in such a way as to divide a primary side and a secondary side inside the pipe P (see FIG. 1 and FIG. 6 of Patent Document 1). However, in this type of filter 100, an effective area for filtering can be easily reduced.

There is a filter 200 hung in a radiator cap C, and placed inside the pipe P which becomes the flow channel for the cooling water of a radiator (see FIG. 7 of the Patent Document 1). However, such filter 200 does not completely divide the aforementioned pipe P, so that the filter 200 is not necessarily sufficient for filtering the cooling water.

PRIOR ART DOCUMENT

Patent Document

Patent Document 1: Japanese Unexamined Utility Model Publication No. S63-49539

SUMMARY OF THE INVENTION

Problems to be Solved by the Invention

A main problem which the present invention attempts to solve is to provide a filter device which can adequately filter the liquid flowing inside the pipe only by being inserted into the pipe which becomes the flow channel of the liquid, and which can ensure a filtering area of a filter material, which effectively works for the filtering, as large as possible.

Means for Solving the Problems

In order to achieve the aforementioned object, in the present invention, a filter device includes a main body portion having a cylinder shape, and also the filter device filters a liquid flowing inside a pipe by being inserted into the pipe which becomes a flow channel of the liquid in such a way that a cylinder axis of the main body portion is inserted along a center axis of the pipe. In the filter device, one end portion of a cylinder of the main body portion is blocked, and between both end portions of the cylinder of the main body portion, there is provided at least one flange portion dividing a space inside the pipe in a liquid-tight state by elastically deforming in the aforementioned insertion and by being attached firmly to an inner surface of the aforementioned pipe. In a cylinder side portion between one end portion of the cylinder and the flange portion, there is provided a first passing portion of the aforementioned liquid which is covered by a filter material. On a nearer side of the other end portion of the cylinder of the filter device rather than the flange portion, there is provided a second passing portion of the liquid.

According to such structure, firstly, the filter device is inserted into the pipe, so that an inside of the pipe is divided liquid-tightly by the flange portion. Then, this insertion can instantly create a state wherein the liquid cannot move from one side to the other side, the one and the other sides being divided by the first passing portion and the second passing portion, unless the liquid passes inside the main body portion. Thereby, in such filter device, the filtering can be administered relative to the whole liquid flowing across the pipe. Also, secondly, the first passing portion is formed in the cylinder side portion between one end portion of the cylinder of the main body portion and the flange portion, and due to the above-mentioned division, the liquid moves inside and outside the main body portion as the flow channel of the first passing portion formed in the cylinder side portion, so that the whole filter material, which covers the first passing portion, can be effectively used for the filtering. Also, an area of the first passing portion, i.e., a filtering area of the filter material can be ensured as large as possible.

The flange portion may protrude to incline in such a way to approach one side of either one end portion of the cylinder of the main body portion or the other end portion of the cylinder as the flange portion goes toward a protruding end thereof. In such a case, when the filter device is inserted into the pipe, accompanied by that, the flange portion can be easily deformed elastically. In an opposite manner, once the filter device has been inserted, the filter device is difficult to slip out of the pipe due to the aforementioned inclination of the flange portion.

Between both end portions of the cylinder of the main body portion, there may be provided a positioning collar portion which is abutted against an abutted portion provided on a pipe side in an insertion end position into the pipe. In such a case, the filter device is inserted into the pipe up to a position wherein the positioning collar portion is abutted against the abutted portion, so that a state, wherein the space inside the pipe is adequately divided by the flange portion, can be stably maintained.

The flange portion may be respectively provided on both sides clamping the positioning collar portion. In such a case, in the insertion of the filter device into the pipe, the positioning collar portion is not abutted against the abutted portion until after the flange portion, which is positioned on a forefront side of the insertion into the pipe, has climbed over the abutted portion by elastically deforming. Unless a resistance of the elastic deformation occurs, an operator for the insertion can clearly recognize that the filter device has not been inserted into the pipe up to a predetermined position.

One end portion of the cylinder of the main body portion and a formation portion of the flange portion may be connected by a cylinder-side-portion structural body comprising a plurality of vertical connecting pieces extending along the cylinder axis of the main body portion, and a horizontal connecting piece between the vertical connecting pieces adjacent each other so as to make the first passing portion between each connecting piece. In that case, one preferred aspect is that the main body portion is molded by an insert molding wherein the filter material made in the cylinder shape is inserted in such a way that the filter material is positioned inside a thickness of each connecting piece.

In such a case, the first passing portion which is covered by the filter material as wide as possible in one portion of the main body portion by each connecting piece can be adequately formed. Also, by such insert molding, the filter material can be firmly placed without any gap between the connecting pieces, and also a filter device comprising the aforementioned structure can be easily manufactured.

Effect of the Invention

According to the filter device with respect to the present invention, only by being inserted into the pipe which becomes the flow channel of the liquid, the space inside the pipe is divided in the liquid-tight state, and the liquid which flows inside the pipe can be adequately filtered. Also, the filter device with respect to the present invention can ensure the filtering area of the filter material, which effectively works for the aforementioned filtering, as large as possible.

BEST MODES OF CARRYING OUT THE INVENTION

Figure 1:
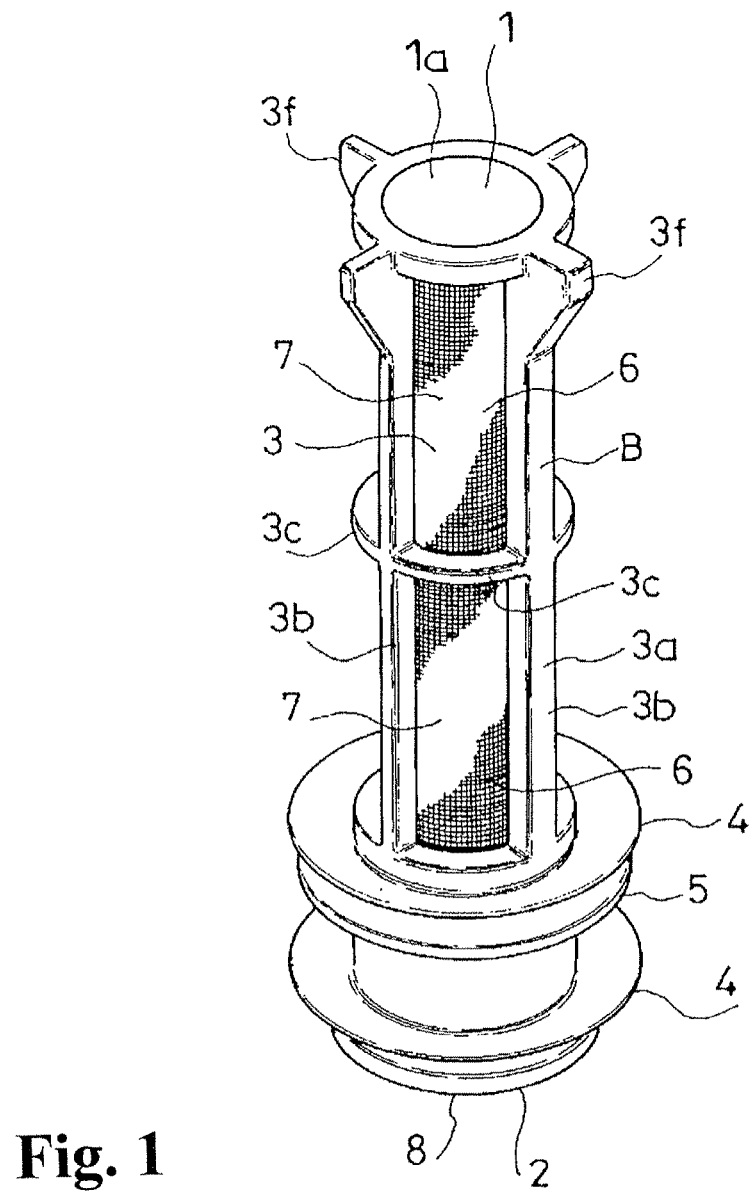
FIG. 1 is a perspective view of a filter device according to an embodiment of the present invention.
Figure 2:
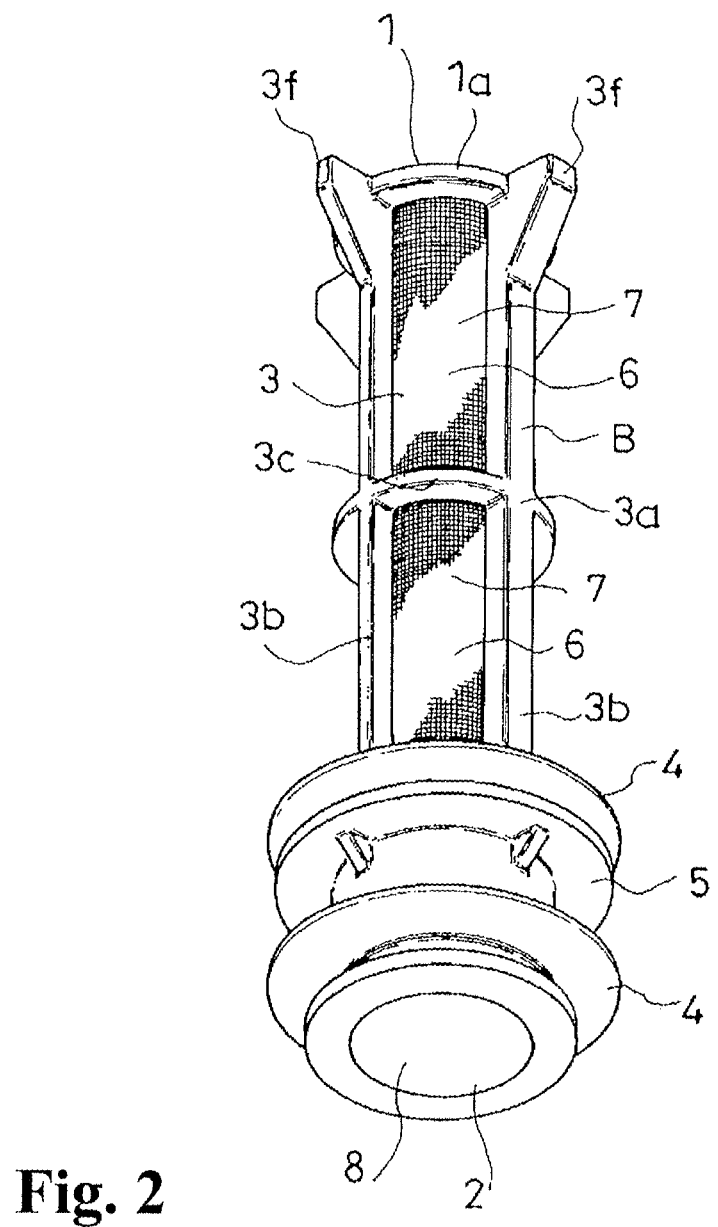
FIG. 2 is a perspective view of the filter device viewed from a direction different from FIG. 1.
Figure 3:
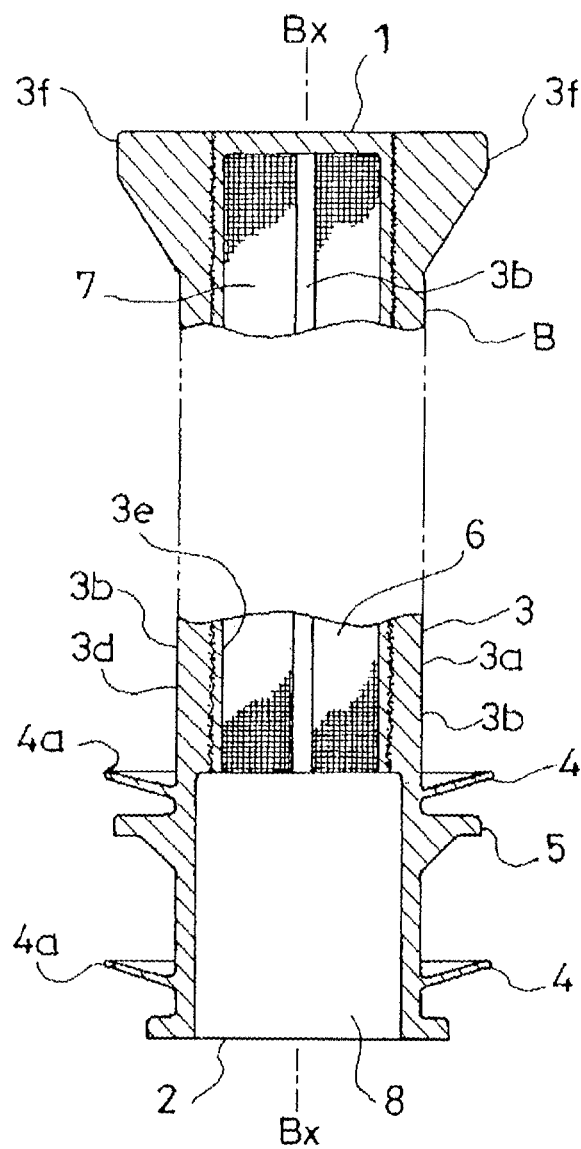
FIG. 3 is a vertical cross-sectional view of the filter device.
Figure 4:
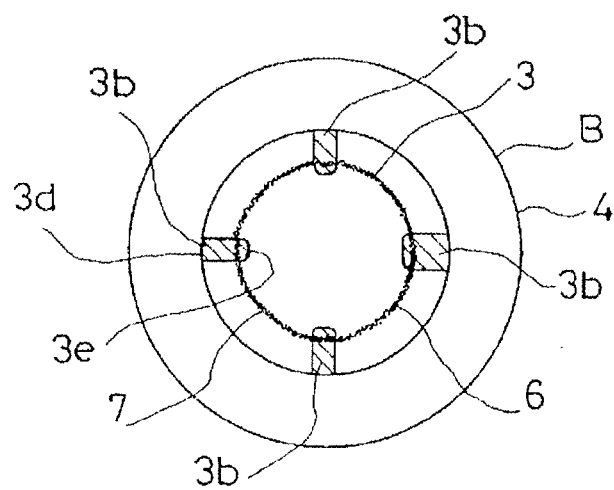
FIG. 4 is a horizontal cross-sectional view of the filter device.
Figure 5:
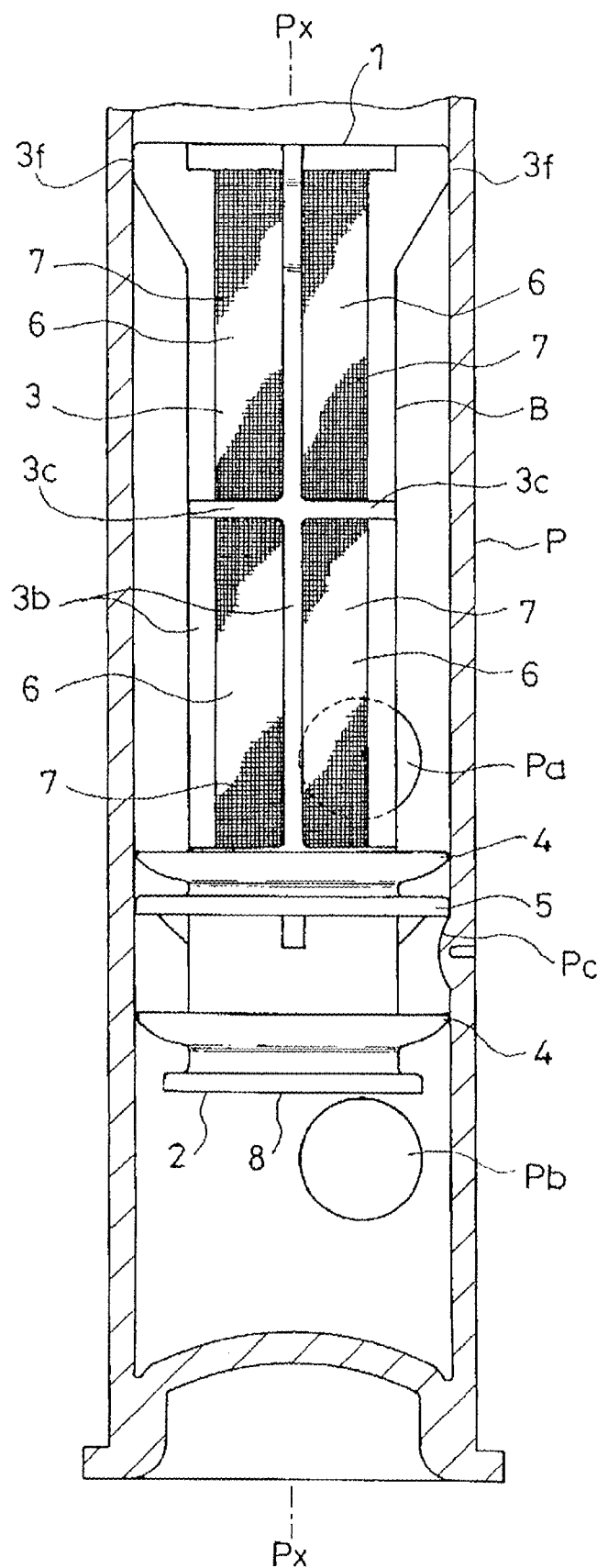
FIG. 5 is a structural view showing a used state of the filter device.
Figure 6:
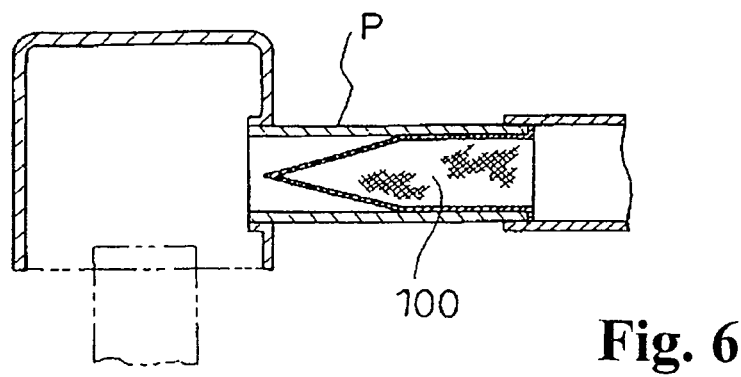
FIG. 6 is a structural view of a conventional example.
Figure 7:
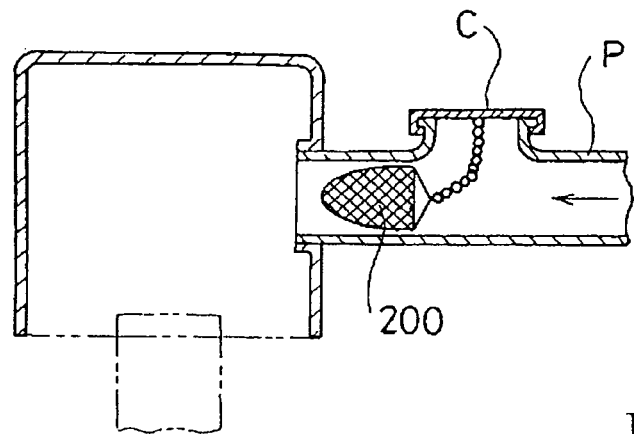
FIG. 7 is a structural view of another conventional example.

Hereinafter, on the basis of FIG. 1 to FIG. 5, a typical embodiment of the present invention will be explained. A filter device according to the embodiment is inserted into a pipe P, which becomes a flow channel of a liquid, and filters the liquid flowing inside the pipe P. Specifically, such filter device includes a main body portion B having a cylinder shape, and also the filter device filters the liquid flowing inside the pipe P by being inserted into the pipe P, which becomes the flow channel of the liquid, in such a way that a cylinder axis Bx of the main body portion B is inserted along a center axis Px of the pipe P.

In an illustrated example, the filter device is inserted into the pipe P which becomes a tank of a radiator, and has a structure suitable for filtering the liquid circulating in the radiator. The reference alphabets Pa and Pb in the drawings represent communicating portions between the pipe P and a core, which is not shown in the drawings, of the radiator. In the illustrated example, the liquid inflows into the pipe P through the communicating portion Pa on an upper side in FIG. 5, and the liquid outflows from an inside of the pipe P through the communicating portion Pb on a lower side in FIG. 5. In the illustrated example, the filter device is inserted and passed through the pipe P from above in FIG. 5, and also accompanied by this insertion, a space inside the pipe P is divided into above and below by the later-mentioned flange portion 4 in a liquid-tight state. The communicating portion Pa on an inflow side is positioned in the space on the upper side divided as described above, and the communicating portion Pb on an outflow side is positioned in the space on the lower side. In the illustrated example, the liquid, which flows into the space on the upper side from a core side of the radiator, reaches the space on the lower side through the filter device, and outflows to such core side again. In this process, the aforementioned filtering of the liquid by the filter device is carried out.

In the main body portion B, one end portion 1 of a cylinder is blocked, and the other end portion 2 of the cylinder is opened. Then, the filter device is made so as to be inserted and passed through the pipe P from the other end portion 2 of the cylinder of the main body portion B as a forefront.

Between both end portions 1 and 2 of the cylinder of the main body portion B, there are provided the flange portion 4 which is attached firmly to an inner surface of the pipe P by elastically deforming in the aforementioned insertion, and divides the space inside the pipe P in the liquid-tight state. In the illustrated example, such flange portion 4 is formed in two portions, one being located at where a portion close to the other end portion 2 of the cylinder of the main body portion B, and the other portion being located slightly above the portion described above. Thereby, the liquid-tight state can be reliably produced. Also, in the illustrated example, between the two flange portions 4 and 4, there is provided the later-mentioned positioning collar portion 5. Also, in the illustrated example, in one end portion 1 of the cylinder of the main body portion B, there are formed widened portions 3f in the later-mentioned vertical connecting pieces 3b. The main body portion B is structured so as to have an outer diameter of the main body portion B which is slightly larger than an inner diameter of the pipe P in the flange portions 4, and to have a thickness approximately equal to the inner diameter of the pipe P in formation portions of the positioning collar portion 5 and the widened portions 3f. The outer diameter of the main body portion B is smaller than the inner diameter of the pipe P in portions except for the formation portions of such flange portions 4, the positioning collar portion 5, and the widened portions 3f. In such portions, between the pipe P and the main body portion B, there is formed the flow channel of the liquid.

The two flange portions 4 and 4 respectively protrude to an outside from the main body portion B, and circle the cylinder axis Bx of the main body portion B in seamless manners. The flange portion 4 is made thin, and is structured so as to have an elastic deformation property. Also, the two flange portions 4 and 4 respectively protrude in an inclination manner in such a way as to approach a side of one end portion 1 of the cylinder of the main body portion B as the flange portions 4 and 4 go toward protruding ends 4a thereof. Thereby, in the present embodiment, when the filter device is inserted into the pipe P from the other end portion 2 of the cylinder of the main body portion B as the forefront, accompanied by that, the two flange portions 4 and 4 can be easily deformed elastically. In an opposite manner, once the filter device has been inserted, the filter device is difficult to slip out of the pipe P due to the aforementioned inclination of the flange portion 4, and is stably positioned inside the pipe P.

Between such two flange portions 4 and 4, there is provided the positioning collar portion 5 which is abutted against an abutted portion Pc provided on the pipe P side in an insertion end position into the pipe P. Such positioning collar portion 5 protrudes to the outside from the main body portion B, and circles the cylinder axis Bx of the main body portion B in a seamless manner. The positioning collar portion 5 is made thick, and is structured so as not to elastically deform unlike the flange portion 4. In the illustrated example, the abutted portion Pc is formed in a portion between the communicating portion Pa on the inflow side and the communicating portion Pb on the outflow side in the pipe P. In the illustrated example, the abutted portion Pc is structured as a bulging portion formed in the inner surface of the pipe P. In a formation position of the bulging portion, the inner diameter of the pipe P is made smaller than the outer diameter of the positioning collar portion 5. Thereby, in the embodiment, the filter device is inserted into the pipe P up to a position wherein the positioning collar portion 5 is abutted against the abutted portion Pc, so that a state wherein the space inside the pipe P is adequately divided by the flange portions 4, i.e., a state wherein the communicating portion Pa on the inflow side is positioned in one side which clamps the flange portion 4, and wherein the communicating portion Pb on the outflow side is positioned in the other side, can be stably maintained. Especially, in the embodiment, the flange portions 4 are respectively provided on both sides clamping the positioning collar portion 5, so that in the insertion of the filter device into the pipe P, the positioning collar portion 5 is not abutted against the abutted portion Pc until after the flange portion 4, which is positioned on a forefront side of the insertion into the pipe P, has climbed over the abutted portion Pc by elastically deforming. Unless a resistance of the elastic deformation occurs, an operator for the insertion can clearly recognize that the filter device has not been inserted into the pipe P up to a predetermined position.

Also, in a cylinder side portion 3 between one end portion 1 of the cylinder in the main body portion B and the flange portion 4, there are provided first passing portions 6 for the liquid which are covered by filter materials 7. Then, on the other end portion 2 side of the cylinder of the filter device rather than the flange portion 4, there is provided a second passing portion 8 for the liquid.

Specifically, the cylinder side portion 3, which is located between one end portion 1 of the cylinder of the main body portion B and the flange portion 4 positioned on one end portion 1 side of the cylinder in the flange portions 4 and 4 of two portions, functions as the first passing portions 6.

In the illustrated example, one end portion 1 of the cylinder of such main body portion B and the formation portion of the flange portion 4 are connected by a cylinder-side-portion structural body 3a comprising a plurality of vertical connecting pieces 3b . . . 3b extending along the cylinder axis Bx of the main body portion B, and horizontal connecting pieces 3c ranged between the vertical connecting pieces 3b and 3b adjacent each other so as to make the first passing portion 6 between the connecting pieces 3b and 3c.

One end portion 1 of the cylinder of the main body portion B is formed by a disk-shaped portion having inner and outer surfaces orthogonal to the cylinder axis Bx of the main body portion B. The vertical connecting pieces 3b are positioned in an outer circumferential portion of the main body portion B, and also are provided with four pieces by providing an approximately equal interval between the vertical connecting pieces 3b adjacent each other in a direction circling the cylinder axis Bx of the main body portion B. In each vertical connecting piece 3b, one end of the piece is integrally connected to a disk-shaped portion 1a, and the other end of the piece is integrally connected to the formation portion of the flange portion 4, respectively. The horizontal connecting piece 3c is provided in such a way as to extend between the vertical connecting pieces 3b in a position of an approximately middle in a length direction of the vertical connecting piece 3b. The horizontal connecting piece 3c is provided along an arc of an imaginary circle wherein the outer circumferential portion of the main body portion B follows. Between one end portion 1 of the cylinder in the main body portion B and the formation portion of the flange portion 4, there is structured the cylinder side portion 3 by the cylinder-side-portion structural body 3a formed by the connecting pieces, and showing a basket shape; and the filter materials 7 which have been placed between the connecting pieces 3b and 3c.

In the illustrated example, each connecting piece 3b and 3c is structured in such a way as to form a slender plate shape having both wide surfaces respectively. Each connecting piece 3b and 3c is placed in such a way that 3d, which is one of both end portions 3d and 3e located in a thickness direction thereof, faces outward of the main body portion B, and that 3e, which is the other of the end portions 3d and 3e, is positioned inward of the main body portion B.

In the illustrated example, the filter material 7 has a sheet shape. In the illustrated example, the filter material 7 is structured as a mesh. Such filter material 7 is selected according to a property of the liquid to be filtered, and typically, a nonwoven cloth and the like is also used for the filter material 7. In the illustrated example, the main body portion B is molded by an insert molding wherein the filter material 7 made in the cylinder shape is inserted in such a way that such filter material 7 is positioned inside a thickness of each connecting piece. Namely, in the illustrated example, the main body portion B is molded by synthetic resin by placing the filter material 7 made in the sheet shape inside a die as an insert in a state wherein the filter material 7 is molded in the cylinder shape so as to structure the filter device. Thereby, in the embodiment, by the connecting pieces 3b and 3c, the first passing portion 6, which is covered by the filter material 7, can be adequately formed as wide as possible in one portion of the main body portion B. Also, by such insert molding, the filter material 7 can be firmly placed between each connecting piece 3b and 3c without any gap, and also the filter device having the aforementioned structure can be easily manufactured.

In the illustrated example, one end of the aforementioned piece of each vertical connecting piece 3b becomes the widened portion 3f structured widely in such a way that the end portion 3d, which has faced the outward of the main body portion B rather than the other portions of the vertical connecting piece 3b, is positioned on the outside. In the filter device which has been inserted into the pipe P, an upper portion side thereof is supported by the widened portion 3f of the four vertical connecting piece 3b, and a lower portion side thereof is supported by the positioning collar portion 5.

Also, in the embodiment, the opened other end portion 2 of the cylinder of the main body portion B functions as the second passing portion 8.

Firstly, the filter device according to the embodiment is inserted into the pipe P, so that the inside of the pipe P is divided liquid-tightly by the flange portions 4. Then, this insertion can instantly create a state wherein the liquid cannot move from one side to the other side, the one and the other sides being divided by the first passing portion 6 and the second passing portion 8, unless the liquid passes inside the main body portion B. Thereby, in such filter device, the filtering can be administered relative to the whole liquid flowing across the pipe P. Also, secondly, the first passing portion 6 is formed in the cylinder side portion 3 between one end portion 1 of the cylinder of the main body portion B and the flange portion 4, and due to the above-mentioned division, the liquid moves inside and outside the main body portion B as the flow channel of the first passing portion 6 formed in the cylinder side portion 3, so that the whole filter material 7, which covers the first passing portion 6, can be effectively used for the filtering. Also, an area of the first passing portion 6, i.e., a filtering area of the filter material 7 can be ensured as large as possible.

All contents of the specification, claims, drawings, and abstract of Japanese Patent Application No. 2010-098720 filed on Apr. 22, 2010 are cited in their entireties herein, and are incorporated as a disclosure of the specification of the present invention.

What is claimed is:
1. A filter apparatus, comprising:
a pipe having a flow channel for a liquid; and
a filter device disposed inside the pipe for filtering the liquid, said filter device comprising:
a main body portion having a cylinder shape, and inserted into the pipe so that a cylinder axis of the main body portion is inserted along a center axis of the pipe, wherein one end portion of the main body portion is blocked;

at least one flange portion provided outside the main body portion between two end portions of the main body portion so that a space inside the pipe is divided in a liquid-tight state by elastic deformation and firm attachment to an inner surface of the pipe upon insertion;

a vertical connecting piece extending along the cylinder axis of the main body portion from the one end portion of the main body portion to the flange portion and having a widened portion protruding outwardly at the one end portion of the main body portion, the widened portion of the vertical connecting piece having a diameter substantially equal to an inner diameter of the pipe;

a first passing portion including a filter material provided in a cylinder side portion between the one end portion of the main body portion and the flange portion, for filtering the liquid; and a second passing portion for passing the liquid provided on a side close to the other end portion of the main body portion than the flange portion, wherein the at least one flange portion has a diameter greater than the inner diameter of the pipe, and protrudes toward a protruding end thereof to incline in a direction approaching one of either the one end portion or the other end portion of the main body portion, the one end portion of the main body portion and a formation portion of the flange portion are connected by a cylinder-side-portion structural body comprising a plurality of vertical connecting pieces, and a horizontal connecting piece extending between the vertical connecting pieces adjacent each other so as to form the first passing portion between the connecting pieces, the main body portion is molded by an insert molding wherein the filter material having the cylinder shape is inserted such that the filter material is positioned inside a thickness of each connecting piece, the one end portion of the main body portion includes a disk-shaped portion integrally formed to the widened portion of the vertical connecting piece, and the other end portion of the main body portion is formed with the second passing portion, the main body portion includes another flange portion formed between the second passing portion and the flange portion of the main body portion, said another flange portion protruding outwardly from the main body portion, and being inclined in a direction same as that of the flange portion, and the flange portion and said another flange portion have a thickness less than that of the main body portion to elastically deform when the main body portion is inserted into the pipe, and the main body portion further comprises a positioning collar portion between the flange portion and said another flange portion of the main body portion, the positioning collar portion having a thickness greater than that of the flange portion to be rigid.

2. A filter device adapted to be inserted into a pipe for filtering a liquid, comprising:

a main body portion having a cylinder shape, and adapted to be inserted into the pipe so that a cylinder axis of the main body portion is inserted along a center axis of the pipe, the main body portion having one end portion having a disk-shaped portion;

a first flange portion provided between two end portions of the main body portion, and adapted to elastically deform to firmly attach to an inner surface of the pipe so that a space inside the pipe is divided in a liquid-tight state;

a plurality of vertical connecting pieces extending along the cylinder axis of the main body portion from the one end portion of the main body portion to the first flange portion and laterally spaced from each other, the plurality of vertical connecting pieces being integrally formed with a widened portion protruding outwardly at the one end portion of the main body portion;

a first passing portion including a filter material provided in a cylinder side portion between the one end portion of the main body portion and the first flange portion, for filtering the liquid;

a horizontal connecting piece extending between the plurality of vertical connecting pieces adjacent to each other;

a second passing portion provided on another end portion of the main body portion, for passing the liquid;

a second flange portion provided between the first flange portion and the another end portion, and adapted to elastically deform to firmly attach to the inner surface of the pipe; and a positioning collar portion provided between the first flange portion and the second flange portion, the positioning collar portion having a thickness greater than that of the first and second flange portions to be rigid, wherein the first and second flange portions protrude outwardly from the main body portion than the positioning collar portion and have a thickness less than that of the positioning collar portion to elastically deform when the main body portion is inserted into the pipe, the first and second flange portions being inclined toward the one end portion of the main body portion, and the disk-shaped portion of the main body portion is formed integrally to each of the widened portion of the plurality of vertical connecting pieces, and the plurality of vertical connecting pieces is integrally connected to the first flange portion.

* * * * *